US007006240B1

(12) United States Patent
Mori

(10) Patent No.: US 7,006,240 B1
(45) Date of Patent: Feb. 28, 2006

(54) IMAGE FORMING APPARATUS FOR PRINTING TWO ORIGINAL DOCUMENTS ON BOTH SIDES OF A PAPER

(75) Inventor: Yujin Mori, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,325

(22) Filed: Feb. 18, 2000

(51) Int. Cl.
*G06F 15/00* (2006.01)
*G06K 15/00* (2006.01)
(52) U.S. Cl. ............... 358/1.13; 399/408; 399/363
(58) Field of Classification Search ........ 382/282–298; 358/1.13–1.15; 399/16, 75, 82, 151, 361, 399/362, 363, 364, 371, 408
See application file for complete search history.

(56) References Cited

U.S. PATENT DOCUMENTS 5,461,459 A * 10/1995 Muramatsu et al. .......... 399/15

5,649,033 A * 7/1997 Morikawa et al. .......... 382/297

FOREIGN PATENT DOCUMENTS

JP 8-274970 A 10/1996
JP 11-38690 A 2/1999

* cited by examiner

*Primary Examiner*—King Y. Poon
(74) *Attorney, Agent, or Firm*—Foley & Lardner LLP

(57) ABSTRACT

Where double-side printing is effected on a single copying paper sheet to produce images of two originals thereon, the directions of images on the originals can be considered. Even where the directions of images on originals, which can be positioned only horizontally due to the structure of a copying machine, are the portrait and landscape, the printing according to the directions of images can be made. Even in the case of originals which can be positioned vertically and horizontally, the originals can be set (for input) in conformity to the direction of paper sheets set in the machine and the printing with regulated directions of images can be made by setting the directions of images. More specifically, even where a vertically positioned original is set horizontal for printing, the same printing result as in the case where it is set vertical can be obtained and the performance of the copying machine is enhanced.

8 Claims, 16 Drawing Sheets

FIG. 8A DIRECTION OF ORIGINAL 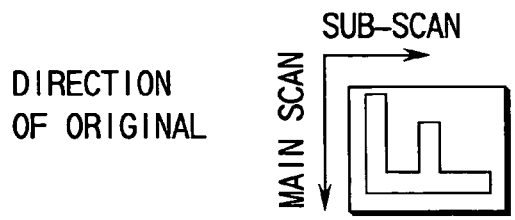
FIG. 8B IMAGE ON PAGE MEMORY 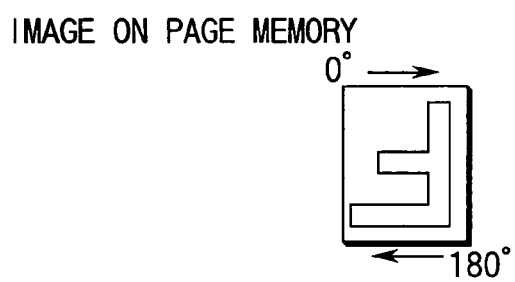
FIG. 8C PRINT ON OBVERSE SIDE 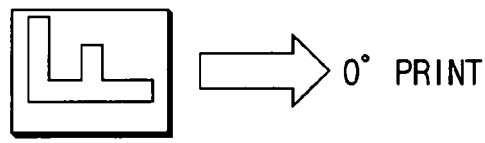 0° PRINT
FIG. 8D PRINT ON REVERSE SIDE 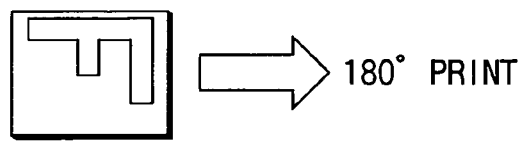 180° PRINT
FIG. 8E PRINT RESULT BINDING AXIS LONGITUDINAL 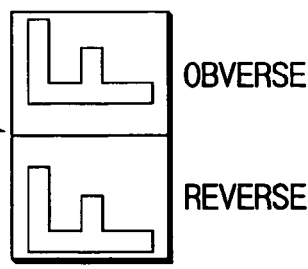 OBVERSE / REVERSE FIG. 9A  DIRECTION OF ORIGINAL 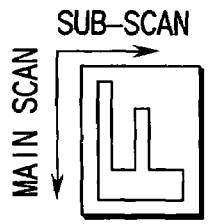
FIG. 9B  IMAGE ON PAGE MEMORY 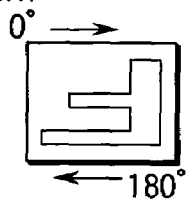
FIG. 9C  PRINT ON OBVERSE SIDE 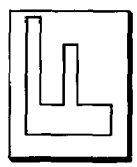 ⇒ 0° PRINT
FIG. 9D  PRINT ON REVERSE SIDE 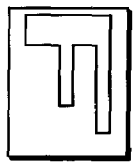 ⇒ 180° PRINT
FIG. 9E  PRINT RESULT BINDING AXIS TRANSVERSE 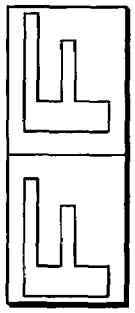 OBVERSE / REVERSE

DIRECTION OF ORIGINAL

IMAGE ON PAGE MEMORY

PRINT ON OBVERSE SIDE → 0° PRINT

PRINT ON REVERSE SIDE → 180° PRINT

PRINT RESULT

BINDING AXIS: TRANSVERSE

REVERSE   OBVERSE

FIG. 11A  DIRECTION OF ORIGINAL
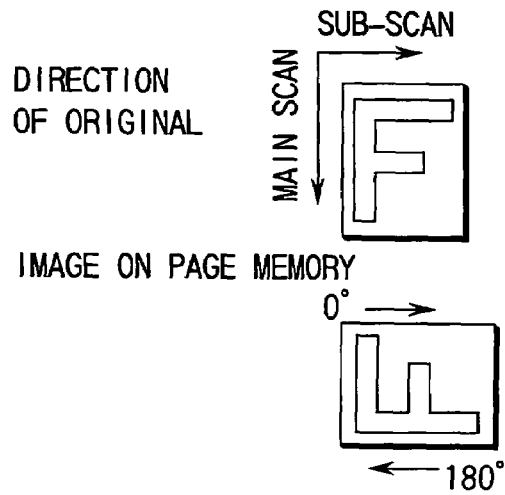
FIG. 11B  IMAGE ON PAGE MEMORY
FIG. 11C  PRINT ON OBVERSE SIDE 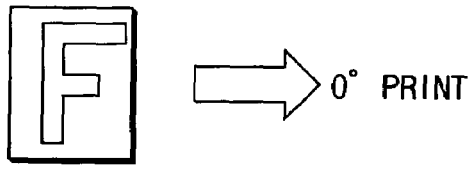 ⇒ 0° PRINT
FIG. 11D  PRINT ON REVERSE SIDE 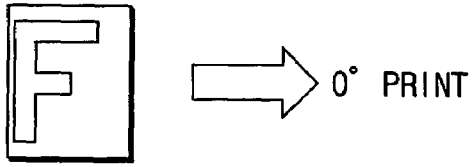 ⇒ 0° PRINT
FIG. 11E  PRINT RESULT
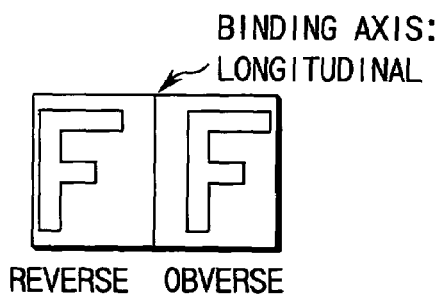
BINDING AXIS: LONGITUDINAL
REVERSE  OBVERSE FIG. 14A DIRECTION OF ORIGINAL 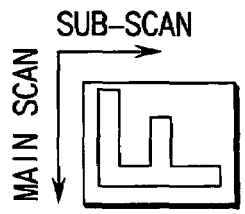
FIG. 14B IMAGE ON PAGE MEMORY 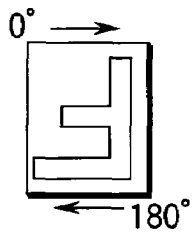
FIG. 14C PRINT ON OBVERSE SIDE 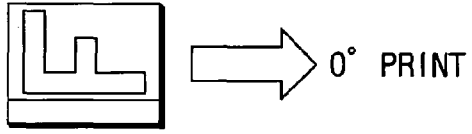 ⇒ 0° PRINT
FIG. 14D PRINT ON REVERSE SIDE 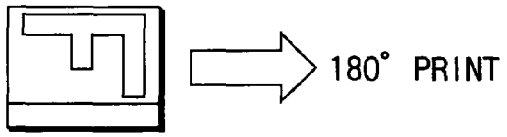 ⇒ 180° PRINT
FIG. 14E PRINT RESULT
BINDING AXIS
(BINDING MARGIN POSITION)
LONGITUDINAL
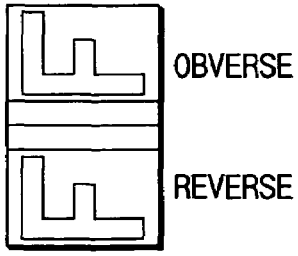
OBVERSE
REVERSE FIG. 15A DIRECTION OF ORIGINAL
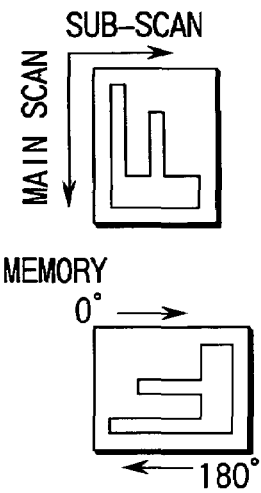
FIG. 15B IMAGE ON PAGE MEMORY
FIG. 15C PRINT ON OBVERSE SIDE
FIG. 15D PRINT ON REVERSE SIDE
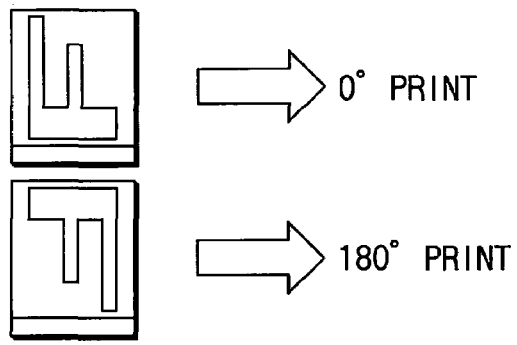
FIG. 15E PRINT RESULT
BINDING AXIS (BINDING MARGIN POSITION)
TRANSVERSE
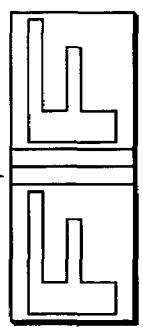
OBVERSE
REVERSE FIG. 16A DIRECTION OF ORIGINAL
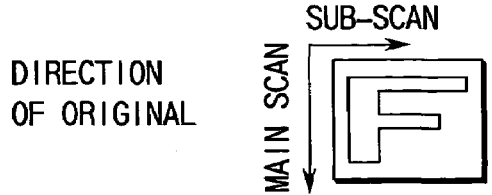
FIG. 16B IMAGE ON PAGE MEMORY
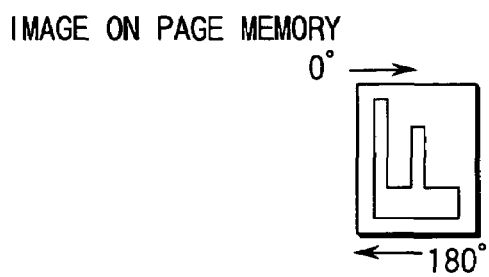
FIG. 16C PRINT ON OBVERSE SIDE
FIG. 16D PRINT ON REVERSE SIDE
FIG. 16E PRINT RESULT
BINDING AXIS (BINDING MARGIN POSITION): TRANSVERSE
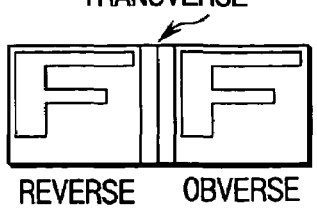

FIG. 17A DIRECTION OF ORIGINAL
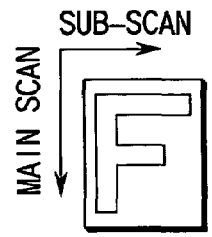
FIG. 17B IMAGE ON PAGE MEMORY
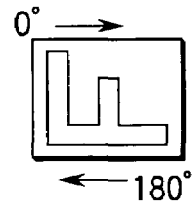
FIG. 17C PRINT ON OBVERSE SIDE
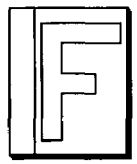 ⇒ 0° PRINT
FIG. 17D PRINT ON REVERSE SIDE
 ⇒ 0° PRINT
FIG. 17E PRINT RESULT
BINDING AXIS (BINDING MARGIN POSITION): LONGITUDINAL
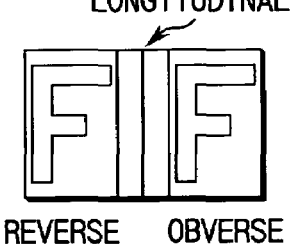
REVERSE   OBVERSE

IMAGE FORMING APPARATUS FOR PRINTING TWO ORIGINAL DOCUMENTS ON BOTH SIDES OF A PAPER

BACKGROUND OF THE INVENTION

The present invention relates to an image forming apparatus for outputting a copy image, as in a case of printing images of two original documents on both sides of a single paper sheet with use of an OA (Office Automation) apparatus such as a copying machine.

In this copying machine, an original document is read by through-read, in which a read operation is effected by a stationary-type scanner which scans an original document, fed by an automatic document feeder (ADF), in units of one scan line.

The read image data is subjected to mirror-image conversion and recorded on a page memory. Then, after subjected to a rotational process, where needed, the image data is printed out.

In the prior art, there are directions of images, i.e. portrait/landscape, for each of a vertically positioned original and a horizontally positioned original.

The portrait of the vertically positioned original is defined such that the longitudinal direction of the original coincides with the up-and-down direction of the image. The portrait of the horizontally positioned original is defined such that the longitudinal direction of the original coincides with the up-and-down direction of the image. The landscape of the vertically positioned original is defined such that the transverse direction of the original coincides with the up-and-down direction of the image. The landscape of the horizontally positioned original is defined such that the transverse direction of the original coincides with the up-and-down direction of the image.

As regards the above-mentioned copying machine, where images of two originals are printed on both sides of a single paper sheet, a process is performed with reference to an end face of a first original at which a final main scan is performed and an end face of a second original at which a first main scan is performed.

Consequently, in the case of the portrait of the vertically positioned original and the landscape of the vertically positioned original, the up-and-down direction of an image printed on the observe side coincides with the up-and-down direction of an image printed on the reverse side. However, in the case of the portrait of the horizontally positioned original and the landscape of the horizontally positioned original, the up-and-down direction of an image printed on the observe side is made opposite to the up-and-down direction of an image printed on the reverse side.

BRIEF SUMMARY OF THE INVENTION

The object of the present invention is to provide an image forming apparatus wherein where images of two originals are printed on both sides of a single paper sheet, even in the case of the portrait of the horizontally positioned original and the landscape of the horizontally positioned original, the up-and-down direction of an image formed on the observe side is made to coincide with the up-and-down direction of an image formed on the reverse side.

In order to achieve this object, according to the present invention, there is provided an image forming apparatus for scanning images on first and second originals each having a main scan direction and a sub-scan direction and forming copy images of the scanning images on an obverse side and a reverse side of an image formation medium, the apparatus comprising: setting means for setting directions of scanning of the first and second originals; first scanning means for scanning the first original conveyed in the direction of scanning of the original set by the setting means; first recording means for recording image data of the first original scanning by the first scanning means; first reading means for reading out the image data of the first original recorded in the first recording means without rotating the image data; first image forming means for forming the image data of the first original reading by the first reading means on the obverse side of the image formation medium; second scanning means for scanning the second original conveyed in the direction of scanning of the original set by the setting means; second recording means for recording image data of the second original read by the second scanning means; second reading means for reading out the image data of the second original recorded in the second recording means without rotating the image data or by rotating the image data over 180° in accordance with the setting by the setting means; and second image forming means for forming the image data of the second original reading by the second reading means on the reverse side of the image formation medium.

There is also provided an image forming apparatus for scanning images on first and second originals each having a main scan direction and a sub-scan direction and forming copy images of the scanning images on an obverse side and a reverse side of an image formation medium, the apparatus comprising: first setting means for setting directions of scanning of the first and second originals; second setting means for setting a binding margin; first scanning means for scanning the first original conveyed in the direction of scanning of the original set by the first setting means; first reading means for recording image data of the first original scanning by the first scanning means; first reading means for reading out the image data of the first original recorded in the first recording means without rotating the image data and by providing the binding margin set by the second setting means; first image forming means for forming the image data of the first original reading by the first reading means on the obverse side of the image formation medium; second scanning means for scanning the second original conveyed in the direction of scanning of the original set by the setting means; second recording means for recording image data of the second original read by the second scanning means; second reading means for reading out the image data of the second original recorded in the second recording means without rotating the image data and by providing the binding margin set by the second setting means, or by rotating the image data over 180° and providing the binding margin set by the second setting means, in accordance with the setting by the setting means; and second image forming means for forming the image data of the second original reading by the second reading means on the reverse side of the image formation medium.

BRIEF DESCRIPTION OF THE SEVERAL VIEWS OF THE DRAWING

FIGS. 8A to 8E and 14A to 14E are views for describing printing processes at the time the portrait of the horizontally positioned original is set;

FIGS. 9A to 9E and 15A to 15E are views for describing printing processes at the time the landscape of the vertically positioned original is set;

FIGS. 10A to 10E and 16A to 16E are views for describing printing processes at the time the landscape of the horizontally positioned original is set or the horizontally positioned original is automatically set; and FIGS. 11A to 11E and 17A to 17E are views for describing printing processes at the time the portrait of the vertically positioned original is set or the vertically positioned original is automatically set.

DETAILED DESCRIPTION OF THE INVENTION

An embodiment of the present invention will now be described with reference to the accompanying drawings.

Figure 1:
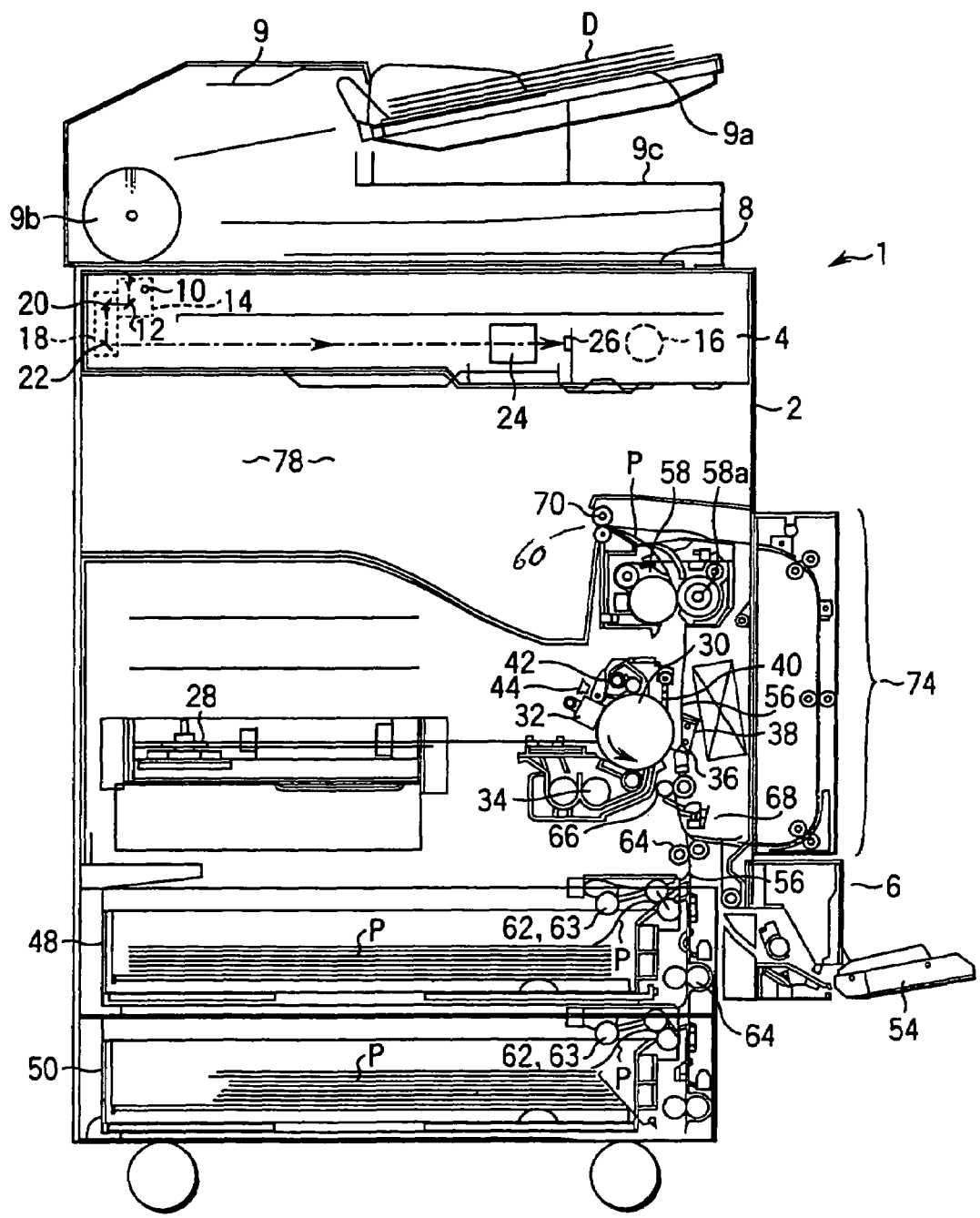
FIG. 1 is a cross-sectional view showing a schematic structure of a digital copying machine according to the present invention.

FIG. 1 is a cross-sectional view showing a schematic structure of a digital copying machine 1 as an example of an image forming apparatus according to the present invention.

As is shown in FIG. 1, the digital copying machine 1 has an apparatus body 2. The apparatus body 2 includes a scanner unit 4 serving as reading means and a printer unit 6 functioning as image forming means.

An original table 8 formed of transparent glass, on which an object to be read, that is, an original D, is placed, is provided on a top surface of the apparatus body 2. In addition, an automatic original document feeder 9 (hereinafter "ADF") serving as means for automatically feeding the original D onto the original table 8 is provided on the top surface of the apparatus body 2.

The original D placed on an original tray 9a of the ADF 9 is conveyed by a convey guide (not shown) and fed onto a discharge tray 9c via a platen roller 9b. Accordingly, while the original D is being conveyed by the platen roller 9b, it is exposed and scanned by an exposure lamp 10 of the scanner unit 4, as will be described later, and an image on the original D is read.

The originals D are set on the original tray 9a of the ADF 9 such that surfaces to be read of the originals D may face upward. The originals D are successively fed in from the uppermost one.

The scanner unit 4 provided within the apparatus body 2 includes the exposure lamp 10 constituted by, e.g. a halogen lamp, serving as a light source for illuminating the original D fed by the ADF 9 or the original D placed on the original table 8, and a first mirror 12 for deflecting reflection light from the original D to a predetermined direction. The exposure lamp 10 and first mirror 12 are attached to a first carriage 14 disposed below the original table 8.

The first carriage 14 is disposed to be movable in parallel to the original table 8. The first carriage 14 is reciprocally moved under the original table 8 by a scanner motor (drive motor) 16 via a toothed belt, etc. (not shown). The scanner motor 16 is constituted by, e.g. a stepping motor.

A second carriage 18 movable in parallel to the original table 8 is disposed below the original table 8. Second and third mirrors 20, 22 for successively deflecting the reflection light from the original D, which has been reflected by the first mirror 12, are attached to the second carriage 18 such that the second and third mirrors 20, 22 are arranged at right angles with each other. A torque from the scanner motor 16 is transmitted to the second carriage 18 by means of the toothed belt, etc. which drives the first carriage 14, and the second carriage 18 is driven following the first carriage 14. In addition, the second carriage 18 is moved in parallel to the original table 8 at a speed corresponding to ½ of the speed of the first carriage 14.

Moreover, a focusing lens 24 for focusing the reflection light from the third mirror 20 on the second carriage 18 and a CCD sensor (line sensor) 26 for photoelectrically converting the reflection light focused by the focusing lens 24 are disposed below the original table 8. The focusing lens 24 is disposed in a plane including an optical axis of the light deflected by the third mirror 22 so as to be movable by means of a driving mechanism. The focusing lens 24, by its own movement, focuses the reflection light with a desired magnification (main scan direction). The CCD sensor 26 photoelectrically converts the incident reflection light in accordance with an image processing clock delivered from a main CPU (to be described later) and outputs an electric signal corresponding to the read original D. The magnification in a sub-scan direction can be controlled by altering the feed speed of the ADF 9 or the speed of movement of the first carriage 14.

When the original D fed by the ADF 9 is read, the position of radiation of the exposure lamp 10 is fixed at a position shown in FIG. 1. When the original D placed on the original table 8 is read, the position of radiation of the exposure lamp 10 is moved from the left to the right along the original table 8.

On the other hand, the printer unit 6 includes a laser exposure device 28 functioning as latent image forming means. A peripheral surface of a photosensitive drum 30 is scanned by a laser beam from the laser exposure device 28 and thus an electrostatic latent image is formed on the peripheral surface of the photosensitive drum 30.

In addition, the printer unit 6 includes the photosensitive drum 30 which is rotatable and serves as an image carrying body. The photosensitive drum 30 is disposed on a right side of an almost central region 78 in the apparatus body 2. The peripheral surface of the photosensitive drum 30 is exposed by the laser beam from the laser exposure device 28 and a desired electrostatic latent image is formed thereon. Around the peripheral surface of the photosensitive drum 30, there are successively provided an electrifying charger 32 for electrifying the drum peripheral surface with a predetermined charge; a developer 34 serving as developing means for supplying toner as developing agent onto the electrostatic latent image formed on the peripheral surface of the photosensitive drum 30 and developing the electrostatic latent image with a desired image density; a transfer charger 38 integrally including a separating charger 36 for separating from the photosensitive drum 30 an image formation medium, i.e. a copying paper sheet P, fed from a cassette 48, 50 (to be described later), the transfer charger 38 functioning to transfer the toner image formed on the photosensitive drum 30 onto the sheet P; a separation claw 40 for separating the copying paper sheet P from the peripheral surface of the photosensitive drum 30; a cleaner 42 for cleaning the toner remaining on the peripheral surface of the photosensitive drum 30; and a destaticizer 44 for de-electrifying the peripheral surface of the photosensitive drum 30.

An upper cassette 48 and a lower cassette 50, which are removable from the apparatus body, are disposed in a stacked fashion in a lower region of the apparatus body 2. Copying paper sheets P with different sizes are put in the respective cassettes 48, 50. A manual feed tray 54 is provided on a lateral side of the upper cassette 48.

A convey path 56 is defined within the apparatus body 2, which extends from each cassette 48, 50 through a transfer section provided between the photosensitive drum 30 and transfer charger 38. At a terminal end of the convey path 56, there is provided a fixing device 58 having a fixing lamp 58a. A discharge port 60 is formed at an upper part of the fixing device 58.

A feed roller 62 and a separation roller 63 for taking out paper sheets P one by one from each cassette 48, 50 are provided near each cassette 48, 50. The convey path 56 is provided with a number of feed roller pairs 64 for conveying through the convey path 56 the copying paper sheets P taken out by the feed roller 62 and separation roller 63.

A register roller pair 66 is provided on an upstream side of the photosensitive drum 30 in the convey path 56. The register roller pair 66 corrects a skew of the taken-out copying paper sheet P, aligns a top end of the toner image on the photosensitive drum 30 with a top end of the copying paper sheet P, and feeds the copying paper sheet P to the transfer section at the same speed as the speed of movement of the peripheral surface of the photosensitive drum 30. A pre-aligning sensor 68 for sensing arrival of the copying paper sheet P is provided on an upstream side of the register roller pair 66, that is, on the feed roller 64 side.

The copying paper sheet P taken out from the cassette 48, 50 one by one by means of the feed roller 62 is fed to the register roller pair 66 by means of the feed roller pair 64. After the top end of the copying paper sheet P has been aligned by the register roller pair 66, the copying paper sheet P is fed to the transfer section.

In the transfer section, the developed image, that is, the toner image, formed on the photosensitive drum 30 is transferred onto the sheet P by the transfer charger 38. The copying paper sheet P on which the toner image has been transferred is separated from the peripheral surface of the photosensitive drum 30 by the functions of the separating charger 36 and separating claw 40. The copying paper sheet P is then conveyed to the fixing device 58 by a convey belt (not shown) constituting a part of the transfer path 56. After the developing agent image is melted and fixed on the copying paper sheet P by the fixing device 58, the copying paper sheet P is discharged by a discharge roller pair 70 onto a discharge tray (not shown) within the apparatus body 2 through the discharge port 60. An automatic double-side device 74 for reversing the copying paper sheet P, which has passed through the fixing device 58, and feeding it to the convey path 56 once again, is provided on a right side of the convey path 56.

An operation panel (to be described later) for instructing various copying conditions, such as copying magnification, and a copying operation start, is provided on an upper front portion of the apparatus body 2.

Figure 2:
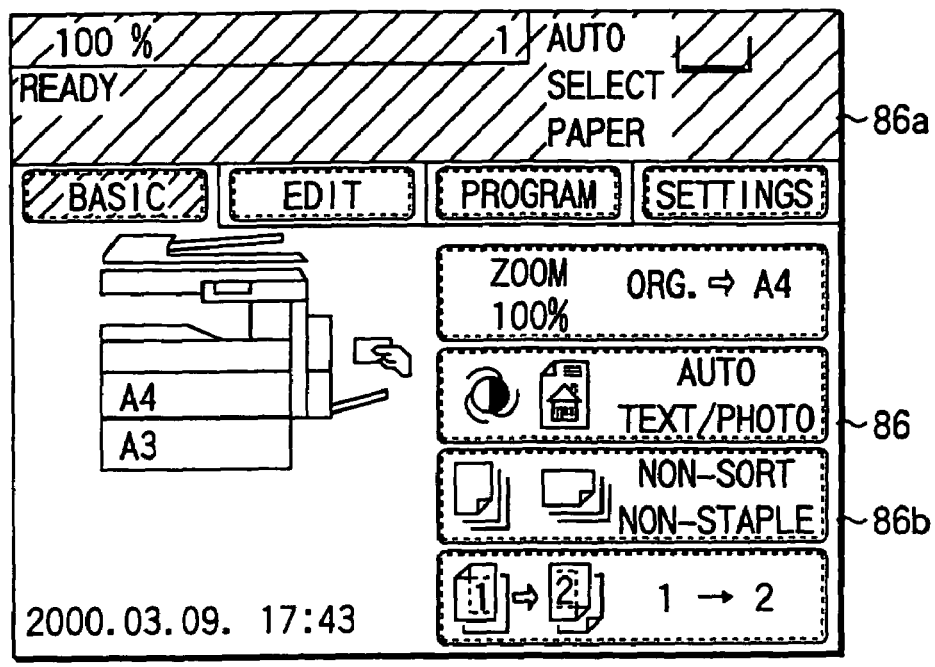
FIGS. 2 to 4 show examples of display images on a liquid crystal display unit.

As is shown in FIG. 2, the operation panel is provided with a liquid crystal display (LCD) unit 86 including touch keys for effecting operation guidance and various instructions.

The LCD unit 86, as shown in FIG. 2, comprises an operation guidance display portion 86a displaying operation guidance of "READY", etc. and a setting display portion 86b displaying various setting contents in a switched manner. The setting display portion 86b, for example, displays a setting screen of a basic function (BASIC) as an initial screen, as shown in FIG. 2. This screen shows a selection state of LCF 52, indicates that a zoom ratio is 100% and an original size is A4, and displays setting of a photo image and a text image, setting of non-sort/non-staple and setting of a double-side mode, and also displays icons for instructing editing, programs and change of settings.

In addition, the setting display portion 86b can display setting screens for application (EDIT), programs (PROGRAM) and setting (SETTINGS). For example, on the setting screens for programs and settings, the priority can be set, jobs canceled, a list of jobs displayed, and the setting of priority altered or added.

Figure 3:
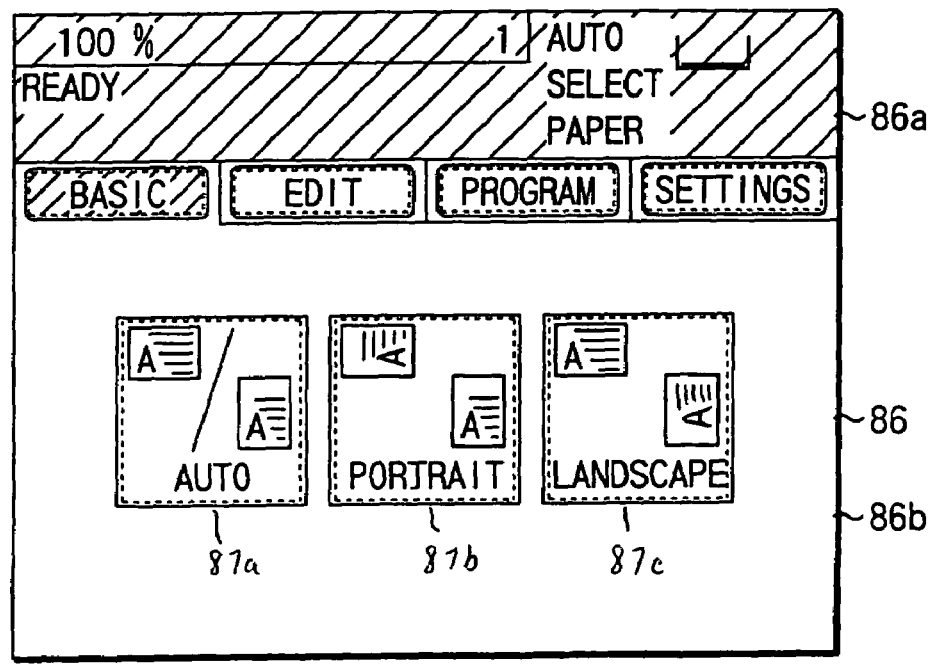

If the double-side mode is set on the initial screen shown in FIG. 2, a setting screen for directions of images is displayed as shown in FIG. 3. This screen displays an icon 87a for setting "AUTO" of a horizontally positioned original and "AUTO" of a vertically positioned original, an icon 87b for setting "PORTRAIT" of a horizontally positioned original and "PORTRAIT" of a vertically positioned original, and an icon 87c for setting "LANDSCAPE" of a horizontally positioned original and "LANDSCAPE" of a vertically positioned original.

Figure 4:
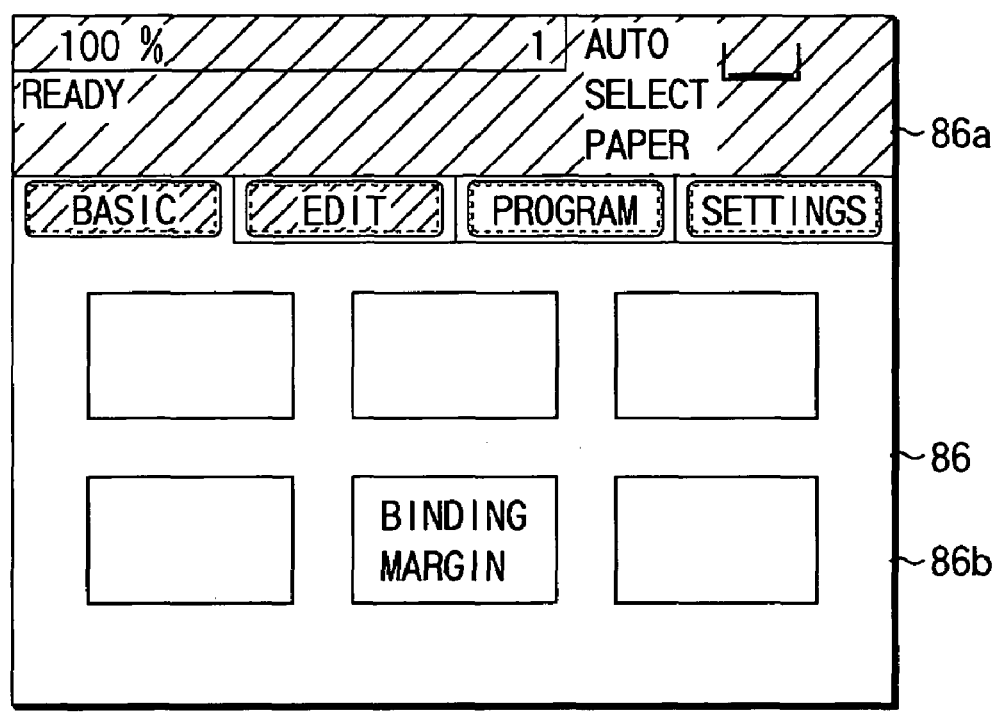

When the icon for application (EDIT) is depressed, a setting screen for a binding margin, as shown in FIG. 4, is displayed. If setting of the binding margin is selected on this screen, the binding margin in the double-side mode can be set.

The digital copying machine 1 may be used as an independent unit, or as a network printer.

In this case, the digital copying machine 1 is connected to personal computers (PC) (not shown) or a server (not shown) via a local network (LAN) (not shown).

Figure 5:
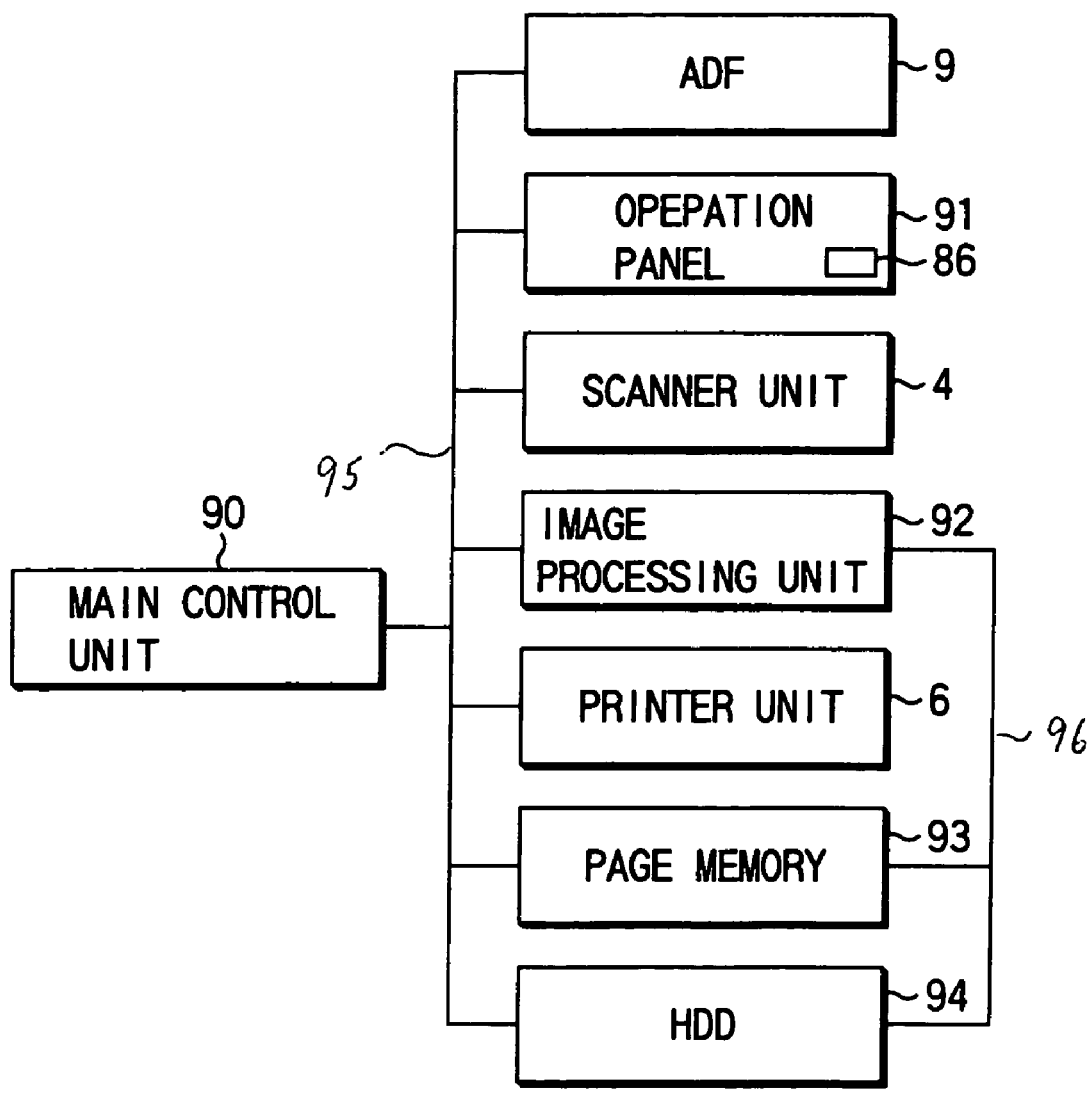
FIG. 5 is a block diagram showing an internal structure of a control circuit in the digital copying machine.

The internal structure of a control circuit of the digital copying machine 1 will now be described with reference to FIG. 5.

The digital copying machine 1 is provided with a main control unit 90 for controlling the entirety of the machine. The main control unit 90 comprises, though not shown, a CPU (central processing unit) for controlling the operation thereof, a ROM (Read only memory) storing software associated with the operation of the digital copying machine 1, and a RAM (random access memory) (S-RAM) for temporarily storing image data and data on operations.

The main control unit 90 is connected to the ADF 9, scanner unit 4, printer unit 6, operation panel 91, image processing unit 92, page memory 93 and HDD 94 via a bus 95. The image processing unit 92, page memory 93 and HDD 94 are connected via an image bus 96.

In the main control unit 90, binding axes are determined on the basis of settings of the directions of images. Specifically, in the case of the auto-mode of the vertically positioned original, the portrait of the vertically positioned original and the portrait of the horizontally positioned original, the binding axis is determined to be the longitudinal direction. In the case of the auto-mode of the horizontally positioned original, the landscape of the horizontally positioned original and the landscape of the vertically positioned original, the binding axis is determined to be the transverse direction.

The image processing unit 92 processes the original image read by the scanner unit 4, processes the image data from the page memory 93 and HDD 94, and outputs the processed image data to the page memory 93, printer unit 6 or HDD 94.

The image processing unit 92 includes a compression/decompression circuit (not shown). Using the compression/decompression circuit, the image processing unit 92 compresses image data from the page memory 93 or decompresses image data from the HDD 94.

The page memory 93 record image data from the image processing unit 92.

The HDD 94 is an external memory device, represented by a hard disk, for recording various data. For example, when a plurality of copies are made, compressed images of scan images of plural originals are recorded. At the time of printing, the compressed images are read out and printed.

The main control unit 91 has input tasks and print tasks managed for each job.

A process of successively reading originals D placed on the tray 9a of the ADF 9 and performing a double-side printing operation in the above-described structure will now be described with reference to flow charts of FIGS. 12 and 13.

To start with, a plurality of originals D are set on the original tray 9a of the ADF 9 with their surfaces to be read facing upward (ST1). The operator sets a double-side mode on the setting display portion 86b of the LCD unit 86 (ST2). Using the setting display portion 86b of the LCD unit 86, the main control unit 90 displays the screen for setting various states of originals in the double-side mode, as shown in FIG. 4.

A description will now be given of a case where the portrait of the horizontally positioned original of the icon 87b has been set on the basis of this display (ST11) and a copy start key (not shown) has been turned on (ST12).

A first original D is conveyed by the ADF 9 and, as shown in FIG. 14A, image data of each scan line in the main scan direction (the transverse direction of the original) is successively read by the CCD sensor 26 of the scanner unit 4 in the sub-scan direction (the longitudinal direction of the original) (ST13). The read image data is subjected to a mirror-image conversion, as shown in FIG. 14B, and recorded on the page memory 93 (ST14). On the basis of the image data recorded on the page memory 93, the main control unit 90 determines the width in the main scan direction and size of the original D.

After the image on the one-page original has been recorded on the page memory 93, the image data of each scan line in the main scan direction is successively read out from the page memory 93 without performing a rotational process (0°), as shown in FIGS. 14B and 14C (ST15'). The readout image data includes information regarding a binding margin to be provided on the lower side of a paper sheet. An electrostatic latent image (exposure image) is formed on the photosensitive drum 30 by a laser beam from the laser exposure device 28 which corresponds to the read-out image data, and this electrostatic latent image is developed (visualized) by the developer 34. On the other hand, a paper sheer is fed from the cassette which stores paper sheets P having the same size as the original D and conveyed to a point before the transfer section. The copying paper sheet P is then conveyed in synchronism with the developed image on the photosensitive drum 30, and the image data of the original D is transferred onto the surface of the copying paper sheet P having the same size as the original D. Following this, the image data is fixed by the fixing device 58. Thus, printing on the obverse side is effected as shown in FIG. 14E (ST16).

A portion of the copying paper sheet P, with some length from its front end, is discharged from the discharge port 60 by the discharge roller 70. Then, the copying paper sheet P is conveyed in the reverse direction and guided to the automatic double-side device 74 by a diverting mechanism (not shown). Thus, the copying paper sheet P is reversed and conveyed once again to the convey path 56 before the register roller pair 66.

On the other hand, a second document D is conveyed by the ADF 9 and, as shown in FIG. 14A, image data of each scan line in the main scan direction (the transverse direction of the original) is successively read by the CCD sensor 26 of the scanner unit 4 in the sub-scan direction (the longitudinal direction of the original) (ST17). The read image data is subjected to a mirror-image conversion, as shown in FIG. 8B, and recorded on the page memory 93 (ST18). On the basis of the image data recorded on the page memory 93, the main control unit 90 determines the width in the main scan direction and size of the original D. In this case, if the width in the main scan direction and size of the second original D differ from those of the first document D, the process is halted.

Where the widths in the main scan direction and sizes of both originals D are the same, the image on the one-page original is recorded on the page memory 93. Then, as shown in FIGS. 14B and 14D, a rotational process of 180° is performed and the image data is recorded on the page memory 93 once again. The image data of each scan line in the main scan direction of the rotated image is successively read out from the page memory 93 (ST19'). The readout image data includes information regarding a binding margin to be provided on the lower side of a paper sheet. An electrostatic latent image (exposure image) is formed on the photosensitive drum 30 by a laser beam from the laser exposure device 28 which corresponds to the read-our image data, and this electrostatic latent image is developed (visualized) by the developer 34.

On the other hand, a copying paper sheet P is fed from the automatic double-side device 74, and the image data of the original D is transferred onto the reverse side of the copying paper sheer P in the transfer section. Following this, the image data is fixed by the fixing device 58. Thus, printing on the reverse side is effected as shown in FIG. 14E (ST20). The copying v paper sheet P is discharged from the discharge port 60 onto the discharge tray 72.

Thereafter, the presence/absence of the original D on the original tray 9a is determined (ST21). If the original D is present, control returns to step 13. If the original D is absent, the process is finished.

As a result, in the state in which the portrait of the horizontally positioned original is set, the images regularly arranged in the same direction with reference to the longitudinal direction of the originals D (copying paper sheet P) are printed on the obverse side and reverse side of the copying paper sheer P, as shown in FIG. 14E.

A description will now be given of a case where the landscape of the vertically positioned original of the icon 87c has been set (ST31) in the state in which the double-side mode is set in step 2 and the copy start key (not shown) has been turned on (ST32).

A first original D is conveyed by the ADF 9 and, as shown in FIG. 15A, image data of each scan line in the main scan direction (the longitudinal direction of the original) is successively read by the CCD sensor 26 of the scanner unit 4 in the sub-scan direction (the transverse direction of the original) (ST33). The read image data is subjected to a mirror-image conversion, as shown in FIG. 15B, and recorded on the page memory 93 (ST34). On the basis of the image data recorded on the page memory 93, the main control unit 90 determines the width in the main scan direction and size of the original D.

After the image on the one-page original has been recorded on the page memory 93, the image data of each scan line in the main scan direction is successively read out from the page memory 93 without performing a rotational process (0°), as shown in FIG. 15B and 15C (ST35'). The readout image data includes information regarding a binding margin to be provided on the lower side of a paper sheet. An electrostatic latent image (exposure image) is formed on the photosensitive drum 30 by a laser beam from the laser exposure device 28 which corresponds to the read-our image data, and this electrostatic latent image is developed (visualized) by the developer 34. On the other hand, a paper sheet is fed from the cassette which stores paper sheets P having the same size as the original D and conveyed to a point before the transfer section. The copying paper sheet P is then conveyed in synchronism with the developed image on the photosensitive drum 30, and the image data of the original D is transferred onto the surface of the copying paper sheet P having the same size as the original D. Following this, the image data is fixed by the fixing device 58. Thus, printing on the obverse side is effected as shown in FIG. 15E (ST36).

A portion of the copying paper sheet P, with some length from its front end, is discharged from the discharge port 60 by the discharge roller 70. Then, the copying paper sheet P is conveyed in the reverse direction and guided to the automatic double-side device 74 by the diverting mechanism (not shown). Thus, the copying paper sheet P is reversed and conveyed once again to the convey path 56 before the register roller pair 66.

On the other hand, a second document D is conveyed by the ADF 9 and, as shown in FIG. 15A, image data of each scan line in the main scan direction (the longitudinal direction of the original) is successively read by the CCD sensor 26 of the scanner unit 4 in the sub-scan direction (the transverse direction of the original) (ST37). The read image data is subjected to a mirror-image conversion, as shown in FIG. 15B, and recorded on the page memory 93 (ST38). On the basis of the image data recorded on the page memory 93, the main control unit 90 determines the width in the main scan direction and size of the original D. In this case, if the width in the main scan direction and size of the second original D differ from those of the first document D, the process is halted.

Where the widths in the main scan direction and sizes of both originals D are the same, the image on the one-page original is recorded on the page memory 93. Then, as shown in FIGS. 15B and 15D, a rotational process of 180° is performed and the image data is recorded on the page memory 93 once again. The image data of each scan line in the main scan direction of the rotated image is successively read out from the page memory 93 (ST39'). The readout image data includes information regarding a binding margin to be provided on the lower side of a paper sheet. An electrostatic latent image (exposure image) is formed on the photosensitive drum 30 by a laser beam from the laser exposure device 28 which corresponds to the read-out image data, and this electrostatic latent image is developed (visualized) by the developer 34.

On the other hand, a copying paper sheet P is fed from the automatic double-side device 74, and the image data of the original D is transferred onto the reverse side of the copying paper sheet P in the transfer section. Following this, the image data is fixed by the fixing device 58. Thus, printing on the reverse side is effected as shown in FIG. 15E (ST40). The copying paper sheet P is discharged from the discharge port 60 onto the discharge tray 72.

Thereafter, the presence/absence of the original D on the original tray 9a is determined (ST41). If the original D is present, control returns to step 33. If the original D is absent, the process is finished.

As a result, in the stare in which the landscape of the vertically positioned original is set, the images regularly arranged in the same direction with reference to the transverse direction of the originals D (copying paper sheet P) are printed on the obverse side and reverse side of the copying paper sheet P, as shown in FIG. 15E.

A description will now be given of a case where the landscape of the horizontally positioned original of the icon 87c has been set or the auto-mode of the horizontally positioned original of the icon 87a has been set (ST51) in the state in which the double-side mode is set in step 2 and the copy start key (not shown) has been turned on (ST52).

A first original D is conveyed by the ADF 9 and, as shown in FIG. 16A, image data of each scan line in the main scan direction (the transverse direction of the original) is successively read by the CCD sensor 26 of the scanner unit 4 in the sub-scan direction (the longitudinal direction of the original) (ST53). The read image data is subjected to a mirror-image conversion, as shown in FIG. 16B, and recorded on the page memory 93 (ST54). On the basis of the image data recorded on the page memory 93, the main control unit 90 determines the width in the main scan direction and size of the original D.

After the image on the one-page original has been recorded on the page memory 93, the image data of each scan line in the main scan direction is successively read out from the page memory 93 without performing a rotational process (0°), as shown in FIGS. 16B and 16C (ST55'). The readout image data includes information regarding a binding margin to be provided on the left side of a paper sheet. An electrostatic latent image (exposure image) is formed on the photosensitive drum 30 by a laser beam from the laser exposure device 28 which corresponds to the read-out image data, and this electrostatic latent image is developed (visualized) by the developer 34. On the other hand, a paper sheer is fed from the cassette which stores paper sheers P having the same size as the original D and conveyed to a point before the transfer section. The copying paper sheet P is then conveyed in synchronism with the developed image on the photosensitive drum 30, and the image data of the original D is transferred onto the surface of the copying paper sheet P having the same size as the original D. Following this, the image data is fixed by the fixing device 58. Thus, printing on the obverse side is effected as shown in FIG. 16E (ST56).

A portion of the copying paper sheet P, with some length from its front end, is discharged from the discharge port 60 by the discharge roller 70. Then, the copying paper sheet P is conveyed in the reverse direction and guided to the automatic double-side device 74 by the diverting mechanism (not shown). Thus, the copying paper sheet P is reversed and conveyed once again to the convey path 56 before the register roller pair 66.

On the other hand, a second document D is conveyed by the ADF 9 and, as shown in FIG. 16A, image data of each scan line in the main scan direction (the transverse direction of the original) is successively read by the CCD sensor 26 of the scanner unit 4 in the sub-scan direction (the longitudinal direction of the original) (ST57). The read image data is subjected to a mirror-image conversion, as shown in FIG. 16B, and recorded on the page memory 93 (ST58). On the basis of the image data recorded on the page memory 93, the main control unit 90 determines the width in the main scan direction and size of the original D. In this case, if the width in the main scan direction and size of the second original D differ from those of the first document D, the process is halted.

Where the widths in the main scan direction and sizes of both originals D are the same, the image on the one-page original is recorded on the page memory 93. Then, as shown in FIGS. 16B and 16D, without performing a rotational process (0°), the image data of each scan line in the main scan direction is successively read out from the page memory 93 (ST59'). The readout image data includes information regarding a binding margin to be provided on the right side of a paper sheet. An electrostatic latent image (exposure image) is formed on the photosensitive drum 30 by a laser beam from the laser exposure device 28 which corresponds to the read-out image data, and this electrostatic latent image is developed (visualized) by the developer 34.

On the other hand, a copying paper sheet P is fed from the automatic double-side device 74, and the image data of the original D is transferred onto the reverse side of the copying paper sheet P in the transfer section. Following this, the image data is fixed by the fixing device 58. Thus, printing on the reverse side is effected as shown in FIG. 16E (ST60). The copying paper sheet P is discharged from the discharge port 60 onto the discharge tray 72.

Thereafter, the presence/absence of the original D on the original tray 9*a* is determined (ST61). If the original D is present, control returns to step 53. If the original D is absent, the process is finished.

As a result, in the state in which the landscape of the horizontally positioned original is set or the auto-mode of the horizontally positioned original is set, the images regularly arranged in the same direction with reference to the transverse direction of the originals D (copying paper sheet P) are printed on the obverse side and reverse side of the copying paper sheet P, as shown in FIG. 16E.

A description will now be given of a case where the portrait of the vertically positioned original of the icon 87*b* has been set or the auto-mode of the vertically positioned original of the icon 87*a* has been set (ST71) in the state in which the double-side mode is set in step 2 and the copy start key (not shown) has been turned on (ST72).

A first original D is conveyed by the ADF 9 and, as shown in FIG. 17A, image data of each scan line in the main scan direction (the longitudinal direction of the original) is successively read by the CCD sensor 26 of the scanner unit 4 in the sub-scan direction (the transverse direction of the original) (ST73). The read image data is subjected to a mirror-image conversion, as shown in FIG. 17B, and recorded on the page memory 93 (ST74). On the basis of the image data recorded on the page memory 93, the main control unit 90 determines the width in the main scan direction and size of the original D.

After the image on the one-page original has been recorded on the page memory 93, the image data of each scan line in the main scan direction is successively read out from the page memory 93 without performing a rotational process (0°), as shown in FIGS. 17B and 17C (ST75'). The readout image data includes information regarding a binding margin to be provided on the left side of a paper sheet. An electrostatic latent image (exposure image) is formed on the photosensitive drum 30 by a laser beam from the laser exposure device 28 which corresponds to the read-out image data, and this electrostatic latent image is developed (visualized) by the developer 34. On the other hand, a paper sheet is fed from the cassette which stores paper sheets P having the same size as the original D and conveyed to a point before the transfer section. The copying paper sheet P is then conveyed in synchronism with the developed image on the photosensitive drum 30, and the image data of the original D is transferred onto the surface of the copying paper sheet P having the same size as the original D. Following this, the image data is fixed by the fixing device 58. Thus, printing on the obverse side is effected as shown in FIG. 17E (ST76).

A portion of the copying paper sheet P, with some length from its front end, is discharged from the discharge port 60 by the discharge roller 70. Then, the copying paper sheet P is conveyed in the reverse direction and guided to the automatic double-side device 74 by the diverting mechanism (not shown). Thus, the copying paper sheet P is reversed and conveyed once again to the convey path 56 before the register roller pair 66.

On the other hand, a second document D is conveyed by the ADF 9 and, as shown in FIG. 17A, image data of each scan line in the main scan direction (the longitudinal direction of the original) is successively read by the CCD sensor 26 of the scanner unit 4 in the sub-scan direction (the transverse direction of the original) (ST77). The read image data is subjected to a mirror-image conversion, as shown in FIG. 11B, and recorded on the page memory 93 (ST78). On the basis of the image data recorded on the page memory 93, the main control unit 90 determines the width in the main scan direction and size of the original D. In this case, if the width in the main scan direction and size of the second original D differ from those of the first document D, the process is halted.

Where the widths in the main scan direction and sizes of both originals D are the same, the image on the one-page original is recorded on the page memory 93. Then, as shown in FIGS. 17B and 17D, without performing a rotational process (0°), the image data of each scan line in the main scan direction is successively read out from the page memory 93 and an electrostatic latent image (exposure image) is formed on the photosensitive drum 30 by a laser beam from the laser exposure device 28 (ST79'). The readout image data includes information regarding a binding margin to be provided on the right side of a paper sheet. The electrostatic latent image is developed (visualized) by the developer 34.

On the other hand, a copying paper sheet P is fed from the automatic double-side device 74, and the image data of the original D is transferred onto the reverse side of the copying paper sheet P in the transfer section. Following this, the image data is fixed by the fixing device 58. Thus, printing on the reverse side is effected as shown in FIG. 17E (ST80). The copying paper sheet P is discharged from the discharge port 60 onto the discharge tray 72.

Thereafter, the presence/absence of the original D on the original tray 9*a* is determined (ST81). If the original D is present, control returns to step 73. If the original D is absent, the process is finished.

As a result, in the state in which the portrait of the vertically positioned original is set or the auto-mode of the vertically positioned original is set, the images regularly arranged in the same direction with reference to the longitudinal direction of the originals D (copying paper sheet P) are printed on the obverse side and reverse side of the copying paper sheet P, as shown in FIG. 17E.

The above-described example is directed to cases where images regularly arranged in the same direction are printed on the obverse and reverse sides of the copying paper sheet P in the double-side printing. Moreover, printing with provision of binding margins may be performed.

Figure 6:
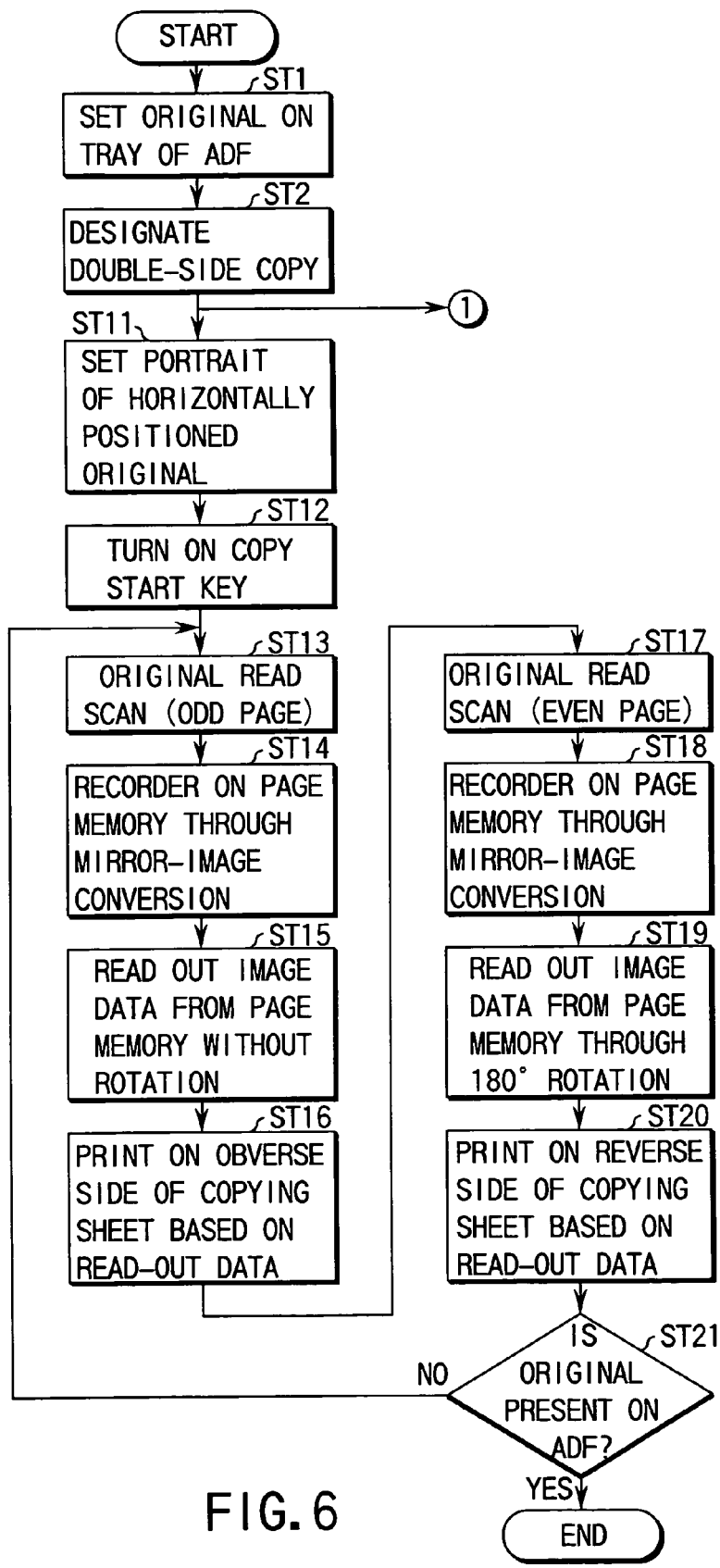
FIGS. 6, 7, 12 and 13 are flow charts illustrating printing processes.
Figure 7:
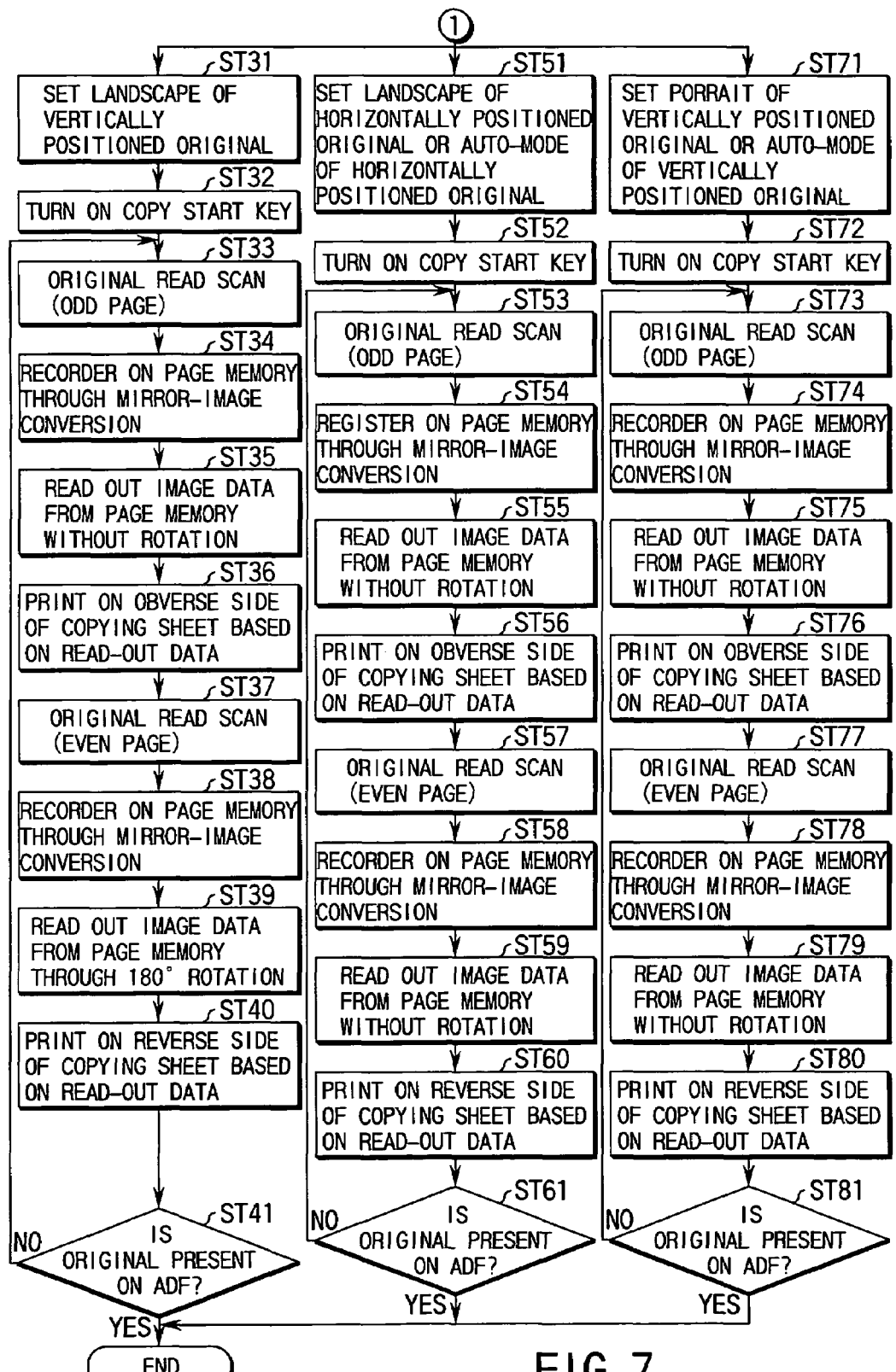
Figure 10A:
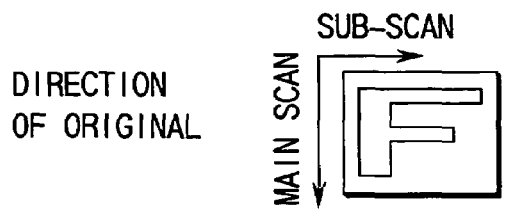
Figure 10B:
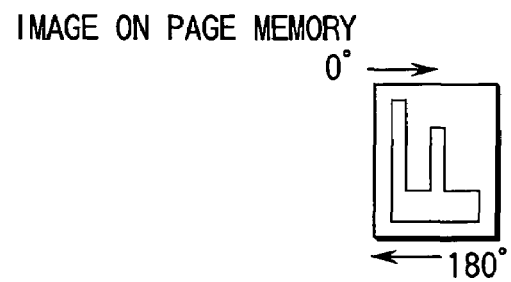
Figure 10C:
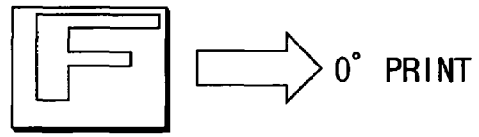
Figure 10D:
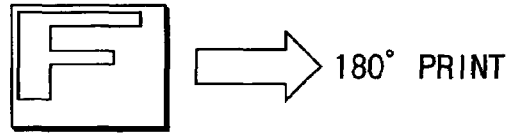
Figure 10E:
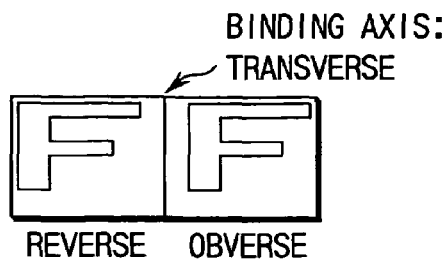
Figure 12:
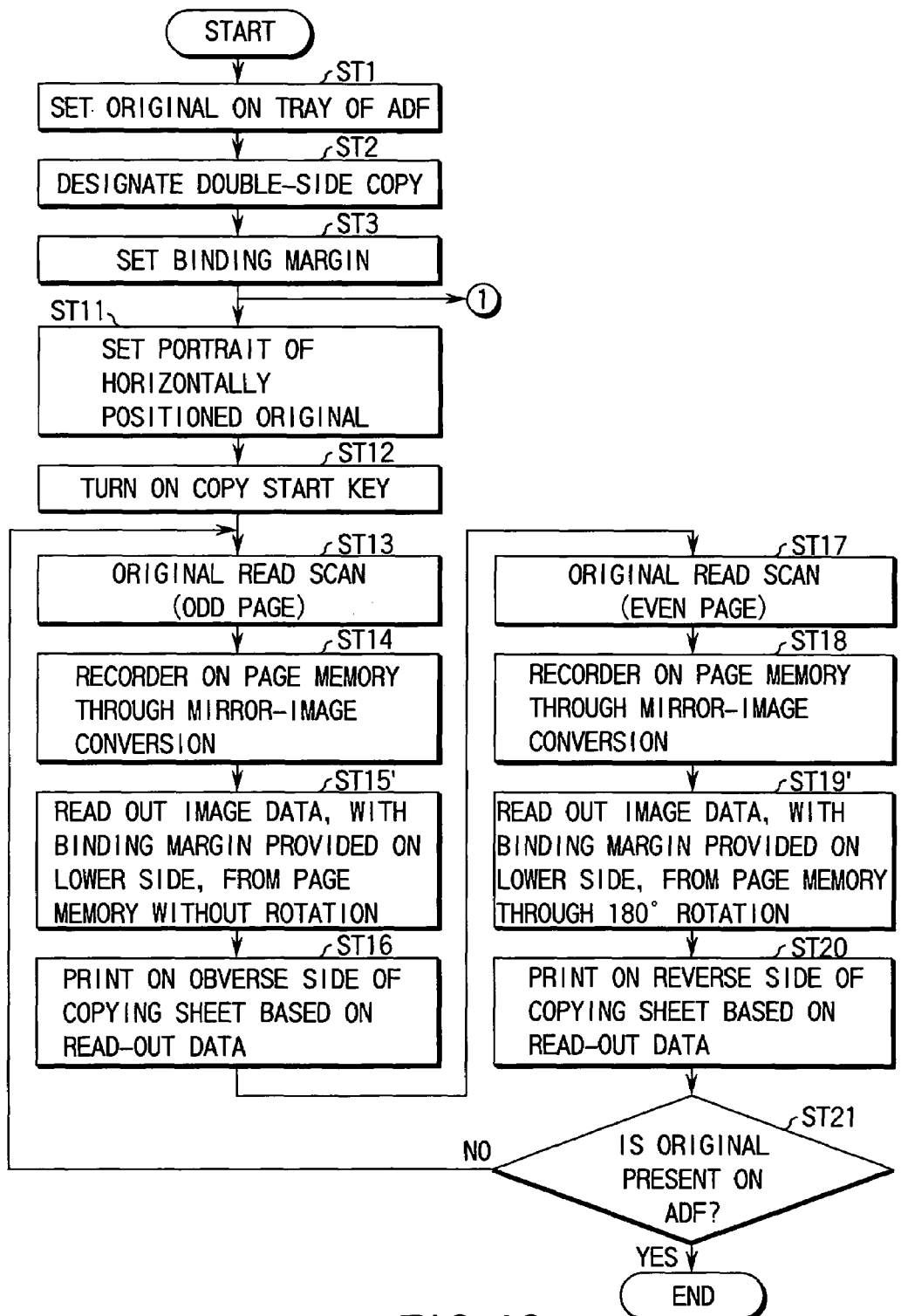
Figure 13:
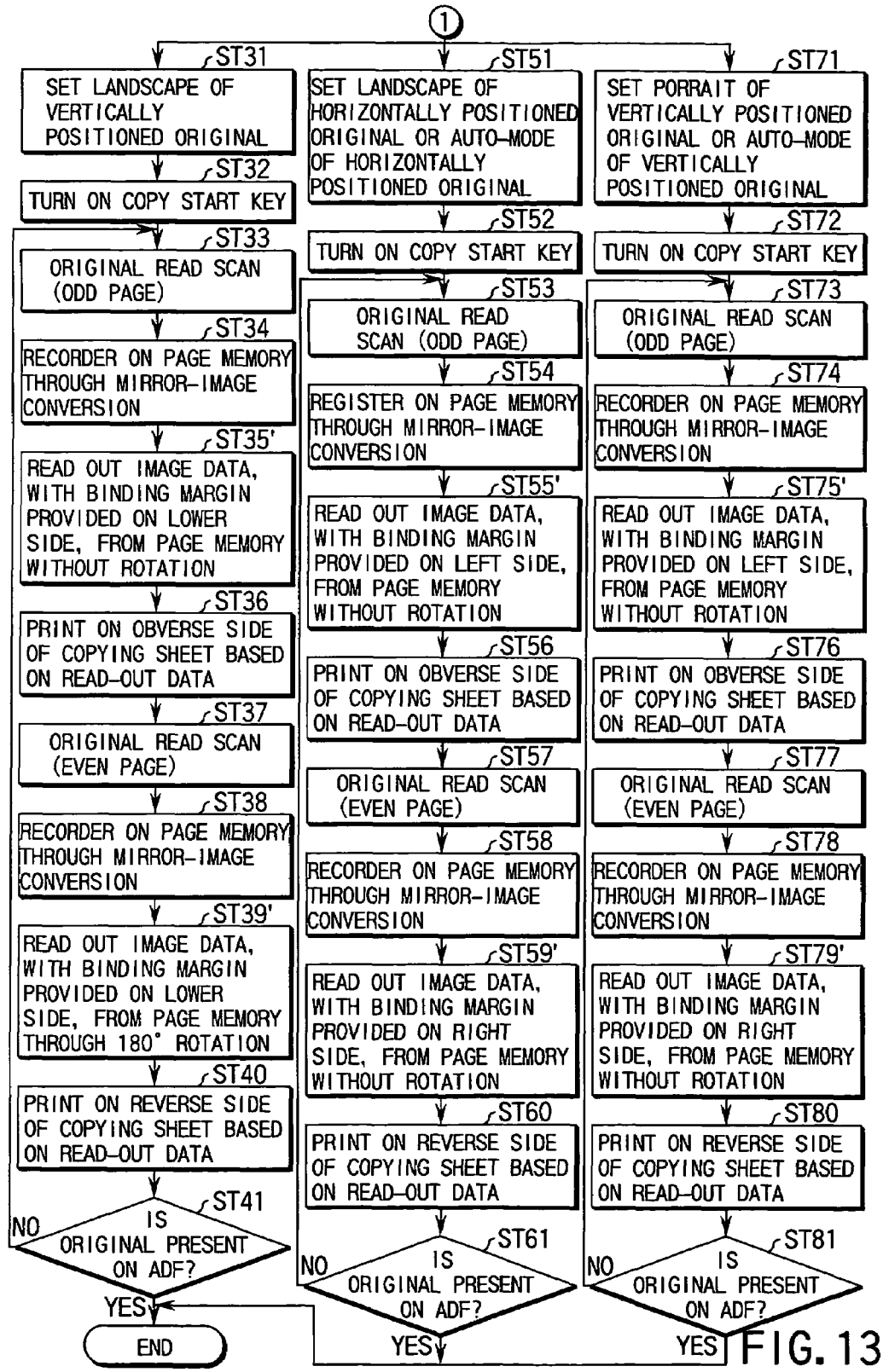

In this case, as illustrated in flow charts of FIGS. 12 and 13, a step 3 for a binding margin setting process is added between step 2 and step 11 in the flow chart of FIG. 6. Besides, the contents of steps 15 and 19 in the flow chart of FIG. 6 and the contents of steps 35, 39, 55, 59, 75 and 79 in the flow chart of FIG. 7 are replaced with the contents of steps 15', 19', 35', 39', 55', 59', 75' and 79' in which the binding margins are provided.

In steps 15', 19', 75' and 79', the binding axis of the binding margin is set with reference to the longitudinal direction of the original D (copying paper sheet P). A binding margin having a width in the transverse direction is provided with reference to the binding axis.

In steps 35', 39', 55' and 59', the binding axis of the binding margin is set with reference to the transverse direction of the original D (copying paper sheet P). A binding margin having a width in the longitudinal direction is provided with reference to the binding axis.

As has been described above, when double-side printing is effected on a single copying paper sheet to produce images of two originals thereon, the directions of images on the originals can be considered. Even where the directions of images on originals, which can be positioned only horizontally due to the structure of the copying machine, are the portrait and landscape, the printing according to the directions of images can be made.

Even in the case of originals which can be positioned vertically and horizontally, the originals can be set (for input) in conformity to the direction of paper sheets set in the machine and the printing with regulated directions of images can be made by setting the directions of images. More specifically, even where a vertically positioned original is set horizontal for printing, the same printing result as in the case where it is set vertical can be obtained and the performance of the copying machine is enhanced.

The above embodiment is directed to cases where directions of images are set in the double-side mode and the binding margin is set on the LCD unit of the operation panel. Where the copying machine is used as the aforementioned network printer, however, the setting may be made from the personal computers (PC) or server connected via the local network (LAN).

What is claimed is:

1. An image forming apparatus for scanning images on first and second originals each having a main scan direction and a sub-scan direction and forming copy images of the scanning images on an obverse side and a reverse side of an image formation medium, the apparatus comprising:

setting means for setting directions of scanning of the first and second originals to one of an automatic of a horizontally positioned original having a transverse main scan direction, an automatic of a vertically positioned original having a longitudinal main scan direction, a portrait of a horizontally positioned original having a transverse main scan direction, a landscape of a vertically positioned original having a longitudinal main scan direction, a landscape of a horizontally positioned original having a transverse main scan direction, and a portrait of a vertically positioned original having a longitudinal main scan direction;

determining means for determining disposing a binding axis in a longitudinal direction if the setting means sets the automatic of the vertically positioned original, the portrait of the vertically positioned original or the portrait of the horizontally positioned original, and determining disposing the binding axis in a transverse direction if the setting means sets the automatic of the horizontally positioned original, the landscape of the horizontally positioned original or the landscape of the vertically positioned original;

first scanning means for scanning the first original conveyed in the direction of scanning of the original set by the setting means;

first recording means for recording image data of the first original scanning by the first scanning means by subjecting the image data to a mirror-image conversion;

first reading means for reading out the image data of the first original recorded in the first recording means without rotating the image data and, providing the data with a binding margin having a width in the transverse direction on the basis of the binding axis if the binding axis determined by the determining means is disposed in the longitudinal direction;

second reading means for reading out the image data of the first original recorded in the first recording means without rotating the image, and providing a binding margin having a width in the longitudinal direction on the basis of the binding axis if the binding axis determined by the determining means is disposed in the transverse direction;

first image forming means for forming the image data of the first original reading by the first or second reading means on the obverse side of the image formation medium;

second scanning means for scanning the second original conveyed in the direction of scanning of the original set by the setting means;

second recording means for recording image data of the second original read by the second scanning means by subjecting the image data to a mirror-image conversion;

third reading means for reading out the image data of the second original recorded in the second recording means without rotating the image data by 180°, and providing the data with the binding margin having the width in the transverse direction on the basis of the longitudinal binding axis determined by the determining means, if the directions of scanning of the second original is the portrait of the horizontally positioned original;

fourth reading means for reading the image data of the second original recorded in the second recording means by rotating the image data by 180°, and providing the data with the binding margin having the width in the longitudinal direction on the basis of the transverse binding axis determined by the determining means, if the directions of scanning of the second original is the landscape of the vertically positioned original;

fifth reading means for reading the image data of the second original recorded in the second recording means without rotating the image data, and providing the data with the binding margin having the width in the transverse direction on the basis of the longitudinal binding axis determined by the determining means, if the directions of scanning of the second original is the automatic of the vertically positioned original or the portrait of the vertically positioned original;

sixth reading means for reading the image data of the second original recorded in the second recording means without rotating the image data, and providing the data with the binding margin having the width in the longitudinal direction on the basis of the transverse binding axis determined by the determining means, if the directions of scanning of the second original is the automatic of the horizontally positioned original or the landscape of the horizontally positioned original; and second image forming means for forming the image data of the second original reading by the second to sixth reading means on the reverse side of the image formation medium.

2. An image forming apparatus according to claim 1, wherein said directions of the first and second originals set by the setting means are a portrait of a horizontally positioned original, a landscape of a vertically positioned original, a landscape of a horizontally positioned original, and a portrait of a vertically positioned original.

3. An image forming apparatus according to claim 1, wherein said directions of the first and second originals set by the setting means are a portrait of a horizontally positioned original, a landscape of a vertically positioned original, a landscape of a horizontally positioned original, and a portrait of a vertically positioned original, and where the directions of reading of the first and second originals are the portrait of the horizontally positioned original or the landscape of the vertically positioned original, the second reading means reading the image data by rotating the image data over 180° and where the directions of scanning of the first and second originals are the landscape of the horizontally positioned original or the portrait of the vertically positioned original, the second to sixth reading means reading the image data without rotating the image data.

4. An image forming apparatus according to claim 1, wherein said first recording means recording the image data of the first original scanning by the first scanning means by subjecting the image data to a mirror-image conversion, and said second recording means recording the image data of the second original scanning by the second scanning means by subjecting the image data to a mirror-image conversion.

5. An image forming apparatus for scanning images on first and second originals each having a main scan direction and a sub-scan direction and forming copy images of the scanning images on an obverse side and a reverse side of an image formation medium, the apparatus comprising:

first setting means for setting directions of scanning of the first and second originals to one of an automatic of a horizontally positioned original having a transverse main scan direction, an automatic of a vertically positioned original having a longitudinal main scan direction, a portrait of a horizontally positioned original having a transverse main scan direction, a landscape of a vertically positioned original having a longitudinal main scan direction, a landscape of a horizontally positioned original having a transverse main scan direction, and a portrait of a vertically positioned original having a longitudinal main scan direction;

determining means for determining disposing a binding axis in a longitudinal direction if the first setting means sets the automatic of the vertically positioned original, the portrait of the vertically positioned original or the portrait of the horizontally positioned original, and determining disposing the binding axis in a transverse direction if the first setting means sets the automatic of the horizontally positioned original, the landscape of the horizontally positioned original or the landscape of the vertically positioned original;

second setting means for setting a binding margin;

first scanning means for scanning the first original conveyed in the direction of scanning of the original set by the first setting means;

first recording means for recording image data of the first original scanning by the first scanning means by subjecting the image data to mirror-image conversion;

first reading means for reading out the image data of the first original recorded in the first recording means without rotating the image data and by providing the data with a binding margin having a width in the transverse direction on the basis of the binding axis if the binding axis determined by the determining means is disposed in the longitudinal direction;

second reading means for reading out the image data of the first original recorded in the first recording means without rotating the image, and providing a binding margin having a width in the longitudinal direction on the basis of the binding axis if the binding axis determined by the determining means is disposed in the transverse direction;

first image forming means for forming the image data of the first original reading by the first or second reading means on the obverse side of the image formation medium;

second scanning means for scanning the second original conveyed in the direction of scanning of the original set by the setting means;

second recording means for recording image data of the second original read by the second scanning means by subjecting the image data to a mirror-image conversion;

third reading means for reading out the image data of the second original recorded in the second recording means without rotating the image data by 180°, and providing the data with the binding margin having the width in the transverse direction on the basis of the longitudinal binding axis determined by the determining means, if the directions of scanning of the second original is the portrait of the horizontally positioned original;

fourth reading means for reading the image data of the second original recorded in the second recording means by rotating the image data by 180°, and providing the data with the binding margin having the width in the longitudinal direction on the basis of the transverse binding axis determined by the determining means, if the directions of scanning of the second original is the landscape of the vertically positioned original;

fifth reading means for reading the image data of the second original recorded in the second recording means without rotating the image data, and providing the data with the binding margin having the width in the transverse direction on the basis of the longitudinal binding axis determined by the determining means, if the directions of scanning of the second original is the automatic of the vertically positioned original or the portrait of the vertically positioned original;

sixth reading means for reading the image data of the second original recorded in the second recording means without rotating the image data, and providing the data with the binding margin having the width in the longitudinal direction on the basis of the transverse binding axis determined by the determining mean, if the directions of scanning of the second original is the automatic of the horizontally positioned original or the landscape of the horizontally positioned original; and second image forming means for forming the image data of the second original reading by the second to sixth reading means on the reverse side of the image formation medium.

6. An image forming apparatus according to claim 5, wherein said directions of the first and second originals set by the first setting means are a portrait of a horizontally positioned original, a landscape of a vertically positioned original, a landscape of a horizontally positioned original, and a portrait of a vertically positioned original.

7. An image forming apparatus according to claim 5, wherein said directions of the first and second originals set by the first setting means are a portrait of a horizontally positioned original, a landscape of a vertically positioned original, a landscape of a horizontally positioned original, and a portrait of a vertically positioned original, and where the directions of scanning of the first and second originals are the portrait of the horizontally positioned original or the landscape of the vertically positioned original, the second reading means reading the image data by rotating the image data over 180° and where the directions of scanning of the first and second originals are the landscape of the horizontally positioned original or the portrait of the vertically positioned original, the second to sixth reading means reading the image data without rotating the image data.

8. An image forming apparatus according to claim 5, wherein said first recording means recording the image data of the first original scanning by the first scanning means by subjecting the image data to a mirror-image conversion, and said second recording means recording the image data of the second original scanning by the second scanning means by subjecting the image data to a mirror-image conversion.

* * * * *